United States Patent [19]

Ray

[11] 4,098,614

[45] Jul. 4, 1978

[54] HYDRAULIC CEMENT MIXES AND PROCESS FOR IMPROVING HYDRAULIC CEMENT MIXES

[75] Inventor: James A. Ray, Mantua, Ohio

[73] Assignee: Martin Marietta Corporation, Bethesda, Md.

[21] Appl. No.: 789,496

[22] Filed: Apr. 21, 1977

[51] Int. Cl.$^2$ ................................................ C04B 7/35
[52] U.S. Cl. ...................... 106/90; 106/104; 106/314
[58] Field of Search ................... 106/90, 314, 315, 104

[56] References Cited

U.S. PATENT DOCUMENTS

| 2,848,340 | 8/1958 | Haldas ................................ 106/315 |
| 4,018,618 | 4/1977 | Petri et al. .......................... 106/314 |

*Primary Examiner*—J. Poer
*Attorney, Agent, or Firm*—Gay Chin; George W. Moxon, II; Ronald G. Ort

[57] ABSTRACT

A hydraulic cement mix including hydraulic cement, aggregate, sufficient water to effect hydraulic setting of the cement, and an additive comprising glycerophosphoric acid or its salts, such as calcium, magnesium, potassium and sodium glycerophosphate, wherein the additive is present in an amount sufficient to increase the strength of the mix when hardened, generally in an amount of up to 0.2% by weight, preferably in an amount of between about 0.005% by weight and 0.2% by weight based upon the weight of the cement, with the range 0.01% to 0.1% by weight also being preferred.

20 Claims, No Drawings

HYDRAULIC CEMENT MIXES AND PROCESS FOR IMPROVING HYDRAULIC CEMENT MIXES

BACKGROUND OF THE INVENTION

This invention relates to additive compositions, also known as admixtures, for incorporation in hydraulic cement mixes, for example, hydraulic cement concretes, mortars, grouts, neat cement mixes, nonplastic cement or concrete mixes, such as concrete block mixes, and dry mixes for making such concretes, mortars, and grouts.

Admixtures are employed to achieve, among other things, water reduction, improved compressive strength, and radiation of the rate of hardening and setting of cement mixes. Frequently, greater compressive strengths are obtained when reduced quantities of water are utilized in hydraulic cement mixes, and so often water reduction and increased compressive strength are achieved together. As retarders, such admixtures slow the chemical process of hydration so that the concrete remains plastic and workable for a longer time than concrete without such a retarder. Among the materials commonly used for water reduction and improved compressive strength, which also act as set retarders, are the lignosulfonates, such as calcium lignosulfonate; salts of hydroxycarboxylic acids; sugars such as glucose (dextrose), maltose, sucrose, fructose, and the like; and highly polymerized polysaccharides, such as dextrins.

Admixtures having set retarding properties are useful as set retarders per se, for example, to delay the set of the cement during difficult placements that require the concrete to be in a plastic condition for a longer than normal period of time or to overcome undesired acceleration of set during hot weather. If the set retarders also achieve improved compressive strength then the improved compressive strength is a supplemental benefit.

Also, additives or admixtures are frequently used in combinations to achieve certain results or overcome inefficiencies, such as where an admixture does not produce a sufficient or significant improvement in the compressive strength or does not effect the desired or a significant degree of retardation while producing other necessary and/or desirable effects. To overcome or assist or amplify these undesirable or insufficient effects, such as for example, an excessive amount of retardation, well known accelerators, such as calcium chloride and triethanolamine, that increase the rate of hydration for early strength development are frequently used. Thus, admixtures which can be used in combination with other admixtures are also desirable.

It is known in the art that some, although not all, plant derived products and carbohydrates will beneficiate concrete or mortar when employed as small percentage additions to the plastic mixes. Some of these, such as molasses, derived from sugar cane or sugar beets, also fall into the category of simple sugars. For example, U.S. Pat. No. 2,311,290 discloses the use of blackstrap molasses in an amount in the range of 0.01% to 0.1% based upon the weight of the concrete. U.S. Pat. No. 3,432,316 also discloses a useful admixture for cement and concrete mixes, which is based upon the use of plant derived products, namely a portion of the tobacco plant, such as aqueous extracts and comminuted cured tobacco plant. This discovery resulted in an admixture which produces a beneficial increase in the compressive strength of the hardened cement mix.

Further materials known to the art for improving the strength of concrete and mortar are the highly polymerized polysaccharides, such as the dextrins. The polysaccharides are less severe retarders of cement hydration than the simple sugars, and they can be used without danger of complete or severe inhibition of hydration and hardening.

U.S. Pat. No. 3,432,317 discloses the use of saccharide polymers, composed of glucose units having a size range of from three to on the order of twenty-five glucose units, as additives for cement mixes. The glucosaccharides are disclosed as being more advantageous than more highly polymerized polysaccharides and more highly depolymerized products. While such an admixture as U.S. Pat. No. 3,432,317 may perform adequately as a means for increasing compressive strength in cements, concretes and mortars, the potential unavailability of materials for producing such admixtures makes alternative admixtures, which produce corresponding desired effects, desirable and necessary.

The problem of unavailability would apply to other known additives and admixtures. Increasing demands can make admixtures unavailable. Lignosulfonates, for example, are not as ubiquitously available as they once were due to the pressures of, among others, environmental restrictions which have forced suppliers to find means of consuming these materials through their own corporate channels. Also, sugars and dextrins are subject to the whims and fancies of speculative interests, and so have become quite costly, as well as occasionally being unavailable.

Further, the increasing cost and unavailability of energy has made it desirable to find, in addition to alternative additives and/or admixtures per se, additives and admixtures which require only a minimum or reduced amount of energy to produce.

Thus, a need exists for new, alternative additive or admixture compositions for incorporation in hydraulic cement mixes, which additives will provide improved compressive strength for or control of the rate of hardening of the resulting cement products, while not causing adverse effects in the hydraulic mixes.

SUMMARY OF THE INVENTION

The present invention involves an additive composition or admixture for incorporation in hydraulic cement mixes, such as concretes, mortars, and grouts, neat cement mixes, nonplastic cement mixes, and dry mixes for making concretes, mortars, and grouts, and thus the improved cement mixes and process for incorporating the additive composition.

For the purposes of this invention, the term "hydraulic cement" is intended to means and to include all cementitious compositions capable of being set and hardened by the action of water, such as Portland cements, sulphate-resisting cements, blast-furnace cements, pozzolanic cements, and high alumina cements, since the additive composition or admixture of the present invention can be incorporated into all hydraulic cement mixes. But the preferred use of the present additive composition or admixture is in Portland type cement mixes. Also for the purposes of this invention, the term "Portland type cement" is intended to include all cementitious compositions which have a high content of tricalcium silicate and thus are Portland cement or are chemically similar or analogous to Portland cement, the specification for which is set forth in ASTM C150-74. This would include cements in which fly ash, such as from steam or power generating stations, pozzolana slag, such as from blast furnaces, or mixtures of these, are incorporated in and which result in a Portland type cement.

Broadly, the invention comprises a hydraulic cement mix including cement, aggregate, sufficient water to effect hydraulic setting of the cement, and an additive comprising glycerophosphoric acid or its salts, the additive being present in an amount sufficient to increase the strength of the mix when hardened. The additive is preferably selected from the group comprising glycerophosphoric acid and the alkali and alkaline earth salts of glycerophosphoric acid, such as calcium glycerophosphate, potassium glycerophosphate, magnesium glycerophosphate and sodium glycerophosphate, with the salt calcium glycerophosphate being additionally preferred, and is present in an amount of up to 0.2% by weight, based upon the weight of the cement, usually between about 0.005% and 0.2% by weight, although an amount in the range of between about 0.01% and about 0.1% by weight is preferred.

Use of the additive is beneficial to the engineering properties of hydraulic cement mixes in that it results in products of improved compressive strength over similar mixes prepared without the additive. Further, use of this additive within the preferred range does not cause adverse effects on the setting times of the hydraulic mixes.

It is therefore an object of the present invention to provide an improved hydraulic cement mix.

It is a further object to provide a process for increasing the strength of cement mixes without adversely affecting the setting times.

It is another object of the present invention to provide a hydraulic cement mix, such as a Portland type or high alumina cement mix, wherein an additive composition or admixture is included which increases the compressive strength of the mix when hardened.

These and other objects and advantages of the invention will become apparent upon consideration of the description and discussion which follow.

DETAILED DESCRIPTION OF THE INVENTION

The glycerophosphoric acid, or glycerylphosphoric, glycerolphosphoric or glycerinophosphoric acid as it is variously known, and the salts thereof, such as the alkali and alkaline earth glycerophosphates, are represented by the following general formula:

$$R_xC_3H_5(OH)_2PO_4$$

where R represents hydrogen or an alkali metal, such as lithium, sodium or potassium, or an alkaline earth metal, such as magnesium or calcium, and $x$ is 2 when R is hydrogen or an alkali metal and $x$ is 1 when R is an alkaline earth metal.

Glycerophosphoric acid is prepared by reacting glycerol and phosphoric acid and is a colorless, odorless liquid which is soluble in water and alcohol. Calcium, magnesium and sodium glycerophosphate are white or colorless powders which are soluble in water and insoluble in alcohol. Potassium glycerophosphate is a pale yellow syrupy liquid which is soluble in alcohol and miscible with water in all proportions. The glycerophosphoric acid and the glycerophosphate salts are commercially available products and have known utility as medicines or dietary supplements and as stabilizers for plastics.

In the practice of the present invention, glycerophosphoric acid or a glycerophosphate salt is incorporated in hydraulic cement mixes, such as portland cement concretes, mortars, and grouts, neat portland cement mixes, nonplastic portland cement mixes, and dry portland cement mixes, high-alumina cement concretes, mortars, etc., and dry mixes for making such concretes, mortars, and the like, in amounts sufficient to increase the compressive strength of the hardened mix upon setting thereof. Broadly, the glycerophosphoric acid or salt will be incorporated in the cement mix in an amount of up to 0.2% by weight based upon the weight of the cement, usually within the range of from about 0.005% by weight to about 0.2% by weight. Preferably, the amount will be within the range of from about 0.01% by weight to about 0.1% by weight based upon the weight of the cement.

The additive of the present invention is incorporated into hydraulic cement mixes preferably by adding it to a portion of the mix water used for mixing of the hydraulic cement and aggregate. But, the additive could be included as part of a dry cement mix or added in any other convenient manner.

The term aggregate is intended to include both fine aggregate, such as sand, and coarse aggregate, such as crushed stone or gravel, as is common in the art. In general for mortars, the aggregate may be sand or other fine aggregate meeting the requirements of ASTM standard C-33. In general for concretes, the aggregate may be sand or other fine aggregate plus crushed stone or gravel or other coarse aggregate in accordance with ASTM standard C-33. The precise size, purity, quality, and quantity, or ranges thereof, of the fine and coarse aggregates will vary depending upon the desired use and properties of the mortar or concrete. For most common uses, although not limited thereto, the size of the fine aggregate will be within the broad range of about +4 mesh to −100 mesh, while the size of the coarse aggregate will be within the broad range of 3 inches to 4 mesh. The coarse aggregate will usually be of mineral origin, such as gravel or crushed rock, but it may in some cases consist at least partially of graded metallic material such as iron chips, slag, or other manufactured aggregate.

Further, in general for dry mortar mixes, the amount of fine aggregate in the mix will be in the range of about 25% to about 75% by weight based upon the weight of the cement mix, depending upon the nature of the aggregate and the desired properties of the mix. For dry concrete mixes, the fine and coarse aggregates will fall generally within the broad range of 20% to 80% by weight of the mix and 5 to 60% by weight of the mix, respectively, depending upon the desired properties and use of the mix.

For both the mortars and cements, the amount of water employed generally should be enough to effect hydraulic setting of the cement present in the mix and to provide suitable workability. This may broadly range from about 20% to 60% by weight of the cement in the mix for the mortars and about 25% to 70% by weight of the cement in the mix for the concretes. The precise amounts of water will depend upon the end use of the cement mix, as well as the aggregate present in the mix.

For purposes of illustrating the advantageous results obtainable by the practice of the present invention, plain cement mixes were prepared and compared with such mixes in which glycerophosphoric acid or its salts have been incorporated in varying dosages. The same type and brand of cement was used in each mix, and the proportion and kind of aggregate employed were substantially the same. A sufficient amount of water was added to each mix to effect hydraulic setting of the cement mix and to produce cement mixes of essentially the same consistency. In addition and for the purpose of further illustrating the invention, comparisons were made with a glucosaccharide, such as would be representative of U.S. Pat. No. 3,432,317, since saccharides are known strength enhancing additives.

glucosaccharide additive was retarding with respect to its setting times in comparison to plain concrete.

Table I

| Mix No. | Additive | Dose; Percent by weight of cement | Water; lbs./cu.yd. of cement product | Air; vol. percent of cement product | Rate of hardening relative to plain mix;[1] hours | Compressive strength of cement product; p.s.i. | |
|---|---|---|---|---|---|---|---|
| | | | | | | 7 days | 28 days |
| Cement No. 1 | | | | | | | |
| 1 | None | — | 301 | 1.6 | 0 | 3220 | 4685 |
| 2 | Calcium Glycerophosphate | .01 | 298 | 1.6 | −⅜ | 3385 | 4950 |
| 3 | " | .025 | 296 | 1.7 | −⅜ | 3510 | 4995 |
| 4 | " | .05 | 297 | 1.6 | −¼ | 3585 | 5115 |
| 5 | Glucosaccharide | .065 | 294 | 1.7 | +⅜ | 3705 | 5145 |
| Cement No. 2 | | | | | | | |
| 6 | None | — | 289 | 1.9 | 0 | 3375 | 4335 |
| 7 | Calcium Glycerophosphate | .01 | 283 | 2.1 | 0 | 3475 | 4640 |
| 8 | " | .025 | 283 | 2.2 | −¼ | 3600 | 4660 |
| 9 | " | .05 | 281 | 2.2 | −¼ | 3625 | 4780 |
| 10 | Glucosaccharide | .065 | 283 | 2.1 | +¼ | 3855 | 4905 |

[1]Acceleration of set is indicated by a minus (−) sign, while retardation of set is indicated by a plus (+) sign.

The results shown in Table II illustrate the use of potassium and sodium glycerophosphate in Type I portland cement mixes to form concretes. The fine aggregate to coarse aggregate ratio employed was 0.48, the same amount of cement was used as in the examples in Table I, and the concretes had slumps in the range of 3 to 3¾ inches. As can be seen, the use of both potassium and sodium glycerophosphate results in increased compressive strengths over similar mixes without the additive, without adversely affecting the setting times of the cement mixes, and, in fact, were slightly accelerating.

Table II

| Mix No. | Additive | Dose; Percent by weight of cement | Water; lbs./cu.yd. of cement product | Air; vol. percent of cement product | Rate of hardening relative to plain mix;[1] hours | Compressive strength of cement product; p.s.i. | |
|---|---|---|---|---|---|---|---|
| | | | | | | 7 days | 28 days |
| Cement No. 1 | | | | | | | |
| 11 | None | — | 314 | 1.8 | 0 | 2865 | 4590 |
| 12 | Potassium Glycerophosphate | .0075 | 310 | 2.1 | −¼ | 2860 | 4545 |
| 13 | " | .0185 | 308 | 2.0 | −¼ | 3120 | 4805 |
| 14 | " | .0375 | 308 | 2.1 | −¼ | 3050 | 4740 |
| 15 | " | .075 | 308 | 2.0 | −¼ | 3060 | 4755 |
| 16 | Sodium Glycerophosphate | .007 | 310 | 2.0 | −¼ | 2905 | 4635 |
| 17 | " | .0175 | 310 | 2.2 | −⅜ | 2940 | 4690 |
| 18 | " | .035 | 309 | 2.3 | −⅜ | 2945 | 4610 |
| 19 | " | .07 | 309 | 2.3 | −1 | 3105 | 4665 |
| 20 | " | .175 | 300 | 2.3 | −⅝ | 3085 | 4525 |
| Cement No. 2 | | | | | | | |
| 21 | None | — | 320 | 1.2 | 0 | 2620 | 3925 |
| 22 | Potassium Glycerophosphate | .0075 | 317 | 1.5 | −¼ | 2700 | 4075 |
| 23 | " | .0185 | 317 | 1.6 | −¼ | 2845 | 4190 |
| 24 | " | .0375 | 315 | 1.9 | 0 | 2735 | 4090 |
| 25 | " | .075 | 314 | 2.0 | −¼ | 2740 | 4185 |
| 26 | Sodium Glycerophosphate | .007 | 316 | 2.0 | −¼ | 2860 | 4085 |
| 27 | " | .0175 | 315 | 2.1 | −⅜ | 2805 | 4190 |
| 28 | " | .035 | 315 | 2.0 | −⅜ | 2865 | 4185 |
| 29 | " | .07 | 315 | 2.1 | −⅜ | 2840 | 4135 |
| 30 | " | .175 | 315 | 2.1 | −⅜ | 2970 | 4050 |

[1]Acceleration of set is indicated by a minus (−) sign, while retardation of set is indicated by a plus (+) sign.

The results shown in Table No. 1 illustrate the use of calcium glycerophosphate in Type I portland cement mixes to form concretes. The fine aggregate to coarse aggregate ratio employed was 0.49, the amount of cement employed was about 5 sacks per yard of concrete (a U.S. sack of cement weighs about 94 lbs/sack), and the concretes had slumps in the range of 3½ to 3¾ inches. As can be seen, the use of calcium glycerophosphate results in increased compressive strengths over similar mixes without the additive, withhout adversely affecting the setting of the cement mixes. In fact, the addition of calcium glycerophosphate resulted in a slight acceleration of the setting times for the cement mixes involved. In comparison to the use of a glucosaccharide additive, the glycerophosphate additive produced comparable compressive strength gains, but the The results shown in Table III illustrate the use of glycerophosphoric additive, namely the calcium, sodium and potassium salts of glycerophosphoric acid, in amounts of up to 0.3% by weight, based upon the weight of the cement. In these examples, the cements were Type I portland cements, the fine to coarse aggregate ratio was 0.48, the amount of cement was about 5 sacks per cubic yard, and the concretes had slumps in the range of about 3¼ to 4 inches. As can be seen from the results in Table III, the use of glycerophosphoric additive generally beneficially increased the compressive strength of concretes, as compared to concretes without additive, when used in amounts of up to 0.3% by weight, but the best results occurred when the additive was used in amounts of up to 0.2% by weight based upon the weight of the cement.

Table III

| Mix No. | Additive | Dose; Percent by weight of cement | Water; lbs./cu.yd. of cement product | Air; vol. percent of cement product | Rate of hardening relative to plain mix;[1] hours | Compressive strength of cement product; p.s.i. | |
|---|---|---|---|---|---|---|---|
| | | | | | | 7 days | 28 days |
| Cement No. 1 | | | | | | | |
| 31 | None | — | 323 | 1.7 | 0 | 3100 | 4510 |
| 32 | Calcium Glycerophosphate | 0.1 | 321 | 1.6 | +⅛ | 3040 | 4500 |
| 33 | " | 0.2 | 315 | 1.7 | +2 | 3340 | 4860 |
| 34 | " | 0.3 | 312 | 1.7 | +4⅝[2] | 3300 | 4920 |
| 35 | Sodium Glycerophosphate | 0.1 | 317 | 1.7 | +⅜ | 3250 | 4560 |
| 36 | " | 0.2 | 312 | 1.7 | +2 | 3320 | 4630 |
| 37 | " | 0.3 | 310 | 1.7 | +9 (Est.)[2] | 3320 | 4510 |
| 38 | Potassium Glycerophosphate | 0.1 | 317 | 1.7 | +¾ | 3270 | 4710 |
| 39 | " | 0.2 | 315 | 1.8 | +2¼ | 3520 | 4860 |
| 40 | " | 0.3 | 314 | 1.7 | +2⅞[2] | 3450 | 4720 |
| Cement No. 2 | | | | | | | |
| 41 | None | — | 308 | 1.8 | 0 | 3270 | 4720 |
| 42 | Calcium Glycerophosphate | 0.1 | 302 | 1.8 | 0 | 3480 | 4930 |
| 43 | " | 0.2 | 299 | 1.9 | +1¼ | 3530 | 4910 |
| 44 | " | 0.3 | 295 | 2.0 | +2⅛ | 3500 | 5090 |
| 45 | Sodium Glycerophosphate | 0.1 | 303 | 2.0 | +⅜ | 3470 | 4610 |
| 46 | " | 0.2 | 298 | 1.9 | +1⅛ | 3490 | 4860 |
| 47 | " | 0.3 | 295 | 2.0 | +3 | 3510 | 4680 |
| 48 | Potassium Glycerophosphate | 0.1 | 298 | 2.0 | +½ | 3430 | 5050 |
| 49 | " | 0.2 | 298 | 1.9 | +2 | 3490 | 4910 |
| 50 | " | 0.3 | 294 | 1.9 | +4¼ | 3290 | 4590 |

[1]Acceleration of set is indicated by a minus (−) sign, while retardation of set is indicated by a plus (+) sign.
[2]These values were obtained in a retest.

The results shown in Table IV compare the use of glycerophosphoric additive, namely calcium glycerophosphate, which is an organic phosphate, against trisodium phosphate, a known inorganic phosphate and strength enhancer. The amount of cement was about 5 sacks per yard of Type I portland cement, the fine to coarse aggregate ratio was 0.49, and the concretes had slumps in the range of 3 ¼ inches to 3 ¾ inches. The results in the Table IV demonstrate that use of the calcium glycerophosphate salt results in generally higher increases of compressive strength than does the inorganic phosphate, and at usually lower doses.

The results in Table V illustrate the use of glycerophosphoric acid in hydraulic cements, and show these results in comparison with two of its salts, namely sodium and calcium glycerophosphate. The glycerophosphoric acid was produced by passing a glycerophosphate salt, in this instance the calcium salt, through a suitable and commercially available ion exchange resin in a known and conventional manner. The amount of Type I portland cement was about 5 sacks of cement per cubic yard of concrete, the fine to coarse aggregate was between about 0.46 and 0.48, and the concretes had slumps in the range of about 3 ¼ inches to about 3 ¾ inches. As is seen from the results in Table V, the use of glycerophosphoric acid generally results in an increase in the compressive strength of cement mixes, as compared to mixes without an additive, in the same manner as do the salts of glycerophosphoric acid.

Table IV

| Mix No. | Additive | Dose; Percent by weight of cement | Water; lbs./cu.yd. of cement product | Air; vol. percent of cement product | Rate of hardening relative to plain mix;[1] hours | Compressive strength of cement product; p.s.i. | |
|---|---|---|---|---|---|---|---|
| | | | | | | 7 days | 28 days |
| Cement No. 1 | | | | | | | |
| 51 | None | — | 324 | 1.8 | 0 | 2920 | 4560 |
| 52 | Trisodium Phosphate | .01 | 320 | 1.8 | +¼ | 2890 | 4480 |
| 53 | " | .05 | 319 | 2.0 | +½ | 2830 | 4540 |
| 54 | " | .1 | 313 | 1.8 | +1 | 2940 | 4700 |
| 55 | " | 1.0 | 312 | 2.1 | Excessive[3] | 2960 | 4610 |
| 56 | Calcium Glycerylphosphate | .05 | 314 | 1.9 | +⅜ | 3070 | 4800 |
| 57 | " | .075 | 311 | 1.9 | +¼ | 2990 | 4710 |
| 58 | " | .1 | 310 | 1.9 | +½ | 2900 | 4350 |
| 59 | " | .25 | 308 | 1.9 | +2¼ | 3260 | 4850 |
| 60 | " | .5 | 300 | 2.3 | Excessive[3] | 3130 | 4930 |
| Cement No. 2 | | | | | | | |
| 61 | None | — | 318 | 1.8 | 0 | 2960 | 4540 |
| 62 | Trisodium Phosphate | .01 | 317 | 2.0 | +150 | 2940 | 4440 |
| 63 | " | .05 | 315 | 1.9 | +¼ | 3100 | 4600 |
| 64 | " | .1 | 312 | 1.9 | +½ | 2950 | 4470 |
| 65 | " | 1.0 | 313 | 2.3 | +2¾ | 3180 | 4720 |
| 66 | Calcium Glycerylphosphate | .05 | 311 | 1.9 | +¼ | 3130 | 4640 |
| 67 | " | .075 | 307 | 1.9 | +⅜ | 3020 | 4440 |
| 68 | " | .1 | 304 | 2.0 | +½ | 3020 | 4270 |
| 69 | " | .25 | 303 | 2.0 | +3 | 3440 | 4860 |
| 70 | " | .5 | 301 | 2.2 | Excessive[3] | 3390 | 4900 |

[1]Acceleration of set is indicated by a minus (−) sign, while retardation of set is indicated by a plus (+) sign.
[3]These mixes were still soft after 12 hours, i.e., they had not hardened, and the exact rate of hardening was not determined.

Table V

| Mix No. | Additive | Dose; Percent by weight of cement | Water; lbs./cu.yd. of cement product | Air; vol. percent of cement product | Rate of hardening relative to plain mix;[1] hours | Compressive strength of cement product; p.s.i. | |
|---|---|---|---|---|---|---|---|
| | | | | | | 7 days | 28 days |
| Cement No. 1 | | | | | | | |
| 71 | None | — | 327 | 1.9 | 0 | 3060 | 4345 |

Table V-continued

| Mix No. | Additive | Dose; Percent by weight of cement | Water; lbs./cu.yd. of cement product | Air; vol. percent of cement product | Rate of hardening relative to plain mix;[1] hours | Compressive strength of cement product; p.s.i. 7 days | 28 days |
|---|---|---|---|---|---|---|---|
| 72 | Glycerophosphoric Acid | .01 | 326 | 1.9 | 0 | 3035 | 4280 |
| 73 | " | .025 | 325 | 2.0 | 0 | 3150 | 4445 |
| 74 | " | .05 | 324 | 2.1 | +¼ | 3085 | 4430 |
| 75 | " | .075 | 324 | 1.9 | +½ | 3030 | 4220 |
| 76 | " | .1 | 323 | 2.1 | +¾ | 3145 | 4310 |
| 77 | " | .15 | 321 | 2.0 | +1¾ | 3540 | 4675 |
| 78 | " | .2 | 317 | 2.1 | +3 | 3540 | 4740 |
| 79 | " | .25 | 315 | 2.4 | +3¾ | 3585 | 4815 |
| Cement No. 2 | | | | | | | |
| 80 | None | — | 318 | 1.9 | 0 | 3115 | 4665 |
| 81 | Glycerophosphoric Acid | .01 | 316 | 2.0 | −¼ | 3200 | 4630 |
| 82 | " | .025 | 316 | 1.9 | 0 | 3190 | 4505 |
| 83 | " | .05 | 316 | 2.0 | 0 | 3175 | 4655 |
| 84 | " | .075 | 314 | 1.9 | +¼ | 3260 | 4695 |
| 85 | " | .1 | 311 | 1.8 | +¾ | 3120 | 4700 |
| 86 | " | .15 | 308 | 1.9 | +1¼ | 2995 | 4635 |
| 87 | " | .2 | 305 | 2.0 | +1¾ | 3245 | 4930 |
| 88 | " | .25 | 303 | 2.0 | +1¾ | 3380 | 5170 |
| Cement No. 1 | | | | | | | |
| 89 | None | — | 325 | 1.8 | 0 | 2955 | 4235 |
| 90 | Sodium Glycerophosphate | .01 | 319 | 2.0 | −¼ | 3110 | 4580 |
| 91 | " | .025 | 319 | 2.2 | −¼ | 3115 | 4520 |
| 92 | " | .05 | 318 | 2.1 | −¼ | 3140 | 4745 |
| 93 | " | .075 | 317 | 2.0 | −¾ | 3265 | 4600 |
| 94 | " | .1 | 314 | 2.1 | 0 | 3095 | 4460 |
| 95 | " | .15 | 311 | 2.1 | +¾ | 3060 | 4315 |
| 96 | " | .2 | 311 | 2.2 | +1 | 3145 | 4380 |
| 97 | " | .25 | 309 | 2.2 | +1¾ | 3420 | 4810 |
| 98 | " | .3 | 309 | 2.1 | +2½ | 3370 | 4650 |
| Cement No. 2 | | | | | | | |
| 99 | None | — | 321 | 1.8 | 0 | 3020 | 4440 |
| 100 | Sodium Glycerophosphate | .01 | 319 | 2.0 | +¼ | 2965 | 4351 |
| 101 | " | .025 | 319 | 2.1 | +¼ | 3060 | 4445 |
| 102 | " | .05 | 316 | 2.1 | +¼ | 2990 | 4520 |
| 103 | " | .075 | 317 | 2.1 | +¼ | 3100 | 4410 |
| 104 | " | .1 | 317 | 2.1 | +¼ | 2990 | 4335 |
| 105 | " | .15 | 315 | 2.0 | +1¼ | 3045 | 4345 |
| 106 | " | .2 | 314 | 2.1 | +1¼ | 2955 | 4280 |
| 107 | " | .25 | 313 | 2.0 | +1¾ | 3015 | 4445 |
| 108 | " | .3 | 311 | 2.4 | +2 | 3225 | 4505 |
| Cement No. 1 | | | | | | | |
| 109 | None | — | 328 | 2.0 | 0 | 3125 | 4290 |
| 110 | Calcium Glycerophosphate | .01 | 327 | 1.9 | 0 | 3430 | 4635 |
| 111 | " | .025 | 325 | 2.2 | 0 | 3445 | 4555 |
| 112 | " | .05 | 326 | 2.1 | 0 | 3590 | 4495 |
| 113 | " | .075 | 326 | 2.1 | 0 | 3510 | 4545 |
| 114 | " | .1 | 325 | 2.2 | +¾ | 3285 | 4240 |
| 115 | " | .15 | 325 | 2.2 | +¾ | 3385 | 4580 |
| 116 | " | .2 | 326 | 2.0 | +1¾ | 3560 | 4815 |
| 117 | " | .25 | 326 | 2.1 | +2¼ | 3595 | 4900 |
| 118 | " | .3 | 326 | 2.1 | +3¼ | 3660 | 4940 |
| Cement No. 2 | | | | | | | |
| 119 | None | — | 321 | 2.4 | 0 | 3070 | 4295 |
| 120 | Calcium Glycerophosphate | .01 | 317 | 2.6 | 0 | 3160 | 4140 |
| 121 | " | .025 | 318 | 2.5 | −¼ | 3190 | 4355 |
| 122 | " | .05 | 316 | 2.8 | −¼ | 3040 | 4115 |
| 123 | " | .075 | 317 | 2.7 | 0 | 3020 | 4190 |
| 124 | " | .1 | 316 | 2.8 | +¼ | 3185 | 4350 |
| 125 | " | .15 | 314 | 2.9 | +½ | 3175 | 4350 |
| 126 | " | .2 | 318 | 2.4 | +¾ | 3330 | 4520 |
| 127 | " | .25 | 319 | 2.3 | +1¼ | 3135 | 4240 |
| 128 | " | .3 | 316 | 2.6 | +1¾ | 3210 | 4355 |

[1] Acceleration of set is indicated by a minus (−) sign, while retardation of set is indicated by a plus (+) sign.

For the purpose of illustrating the utility of glycerophosphoric acid and its salts in other hydraulic cements, calcium glycerophosphate was tested in limited dosages in a commercially available high alumina cement mix. Calcium glycerophosphate was selected simply as an example of glycerophosphoric acid and its salts, and was employed in dosages of 0.05% and 0.075% by weight based upon the weight of the cement. The high alumina cement employed was "CEMENT FONDU," which typically comprises, in percentages by weight, 40% $Al_2O_3$, less than 2% $TiO_2$, 38% CaO, 11% $Fe_2O_3$, 4% FeO, and less than 5% $SiO_2$, but other high alumina cements are available, such as "LUMNITE" and "REFCON," and could have been employed. The cement mix comprises a high alumina concrete mix containing about 5 ½ sacks (at 94 lbs. per sack) of cement per cubic yard of concrete, the fine aggregate to coarse aggregate ratio was 0.47, and the consistencies of the concretes were such that they had slumps in the range of 3 ¼ to 3 ¾ inches. The results, which are set forth in Table VI, and which, for convenience, show the compressive strengths at one and seven days only, show that calcium glycerophosphate, and therefore glycerophosphoric acid and its salts, are useful in high alumina cements to increase the compressive strength of the hardened cement mix. The fact that calcium glycerophosphate produced a retardation in the rate of hardening of the cement mix involved means that glycerophosphoric acid and its salts also would be useful as retarders per se in high alumina cements.

Table VI

| Dose of Calcium Glycerophosphate Additive; percent by weight of cement | Cement; lbs./cu.yd. of cement product | Water; lbs./cu.yd. of cement product | Air; vol. percent of cement product | Rate of hardening relative to plain mix;[1] hours | Compressive strength of cement product; p.s.i. | |
|---|---|---|---|---|---|---|
| | | | | | 1 day | 7 days |
| None | 514 | 296 | 1.5 | 0 | 3500 | 4060 |
| .05 | 515 | 291 | 1.5 | +1 ¾ | 3980 | 4510 |
| .075 | 517 | 289 | 1.5 | +1 ¾ | 4080 | 4740 |

[1]Acceleration of set is indicated by a minus (−) sign, while retardation of set is indicated by a plus (+) sign.

It is within the scope of the invention to incorporate, in the cement mixes prepared as herein provided, other additives known in the art for the express purpose for which they are normally employed. Such other additives may, for example, be air-entraining agents, airdetraining agents, pozzolanic materials, fly ash, coloring agents, water repellents, set accelerators, and the like. Glycerophosphoric acid or its salts may also be employed in conjunction with a combination of such cement additives to produce desired changes in the physical properties of the concrete being produced.

It is also within the scope of the invention to employ the glycerophosphoric acid or its salts together with known set retarders, such as lignosulfonates, sugars, glucosaccharides, and the like, or combinations thereof to obtain improvement in the compressive strength of the hardened mix, but with less retarding effect than would result from such set retarders. The glycerophosphoric acid and its salts and said known set retarders can also be employed together with conventional set accelerators as mentioned above to achieve a desired combination of benefits.

While the invention has been described with reference to certain preferred embodiments thereof, those skilled in the art will appreciate that various changes and modifications and substitutions can be made without departing from the spirit of the invention. It is intended, therefore, that the invention will be limited only by the scope of the claims which follow.

What I claim is:

1. A hydraulic cement mix including hydraulic cement, aggregate, sufficient water to effect hydraulic setting of the cement, and an additive comprising glycerophosphoric acid or a salt of glycerophosphoric acid, said additive being present in an amount sufficient to increase the strength of the mix when hardened.

2. A hydraulic cement mix as claimed in claim 1 wherein said additive is present in an amount of up to 0.2% by weight based upon the weight of the cement.

3. A hydraulic cement mix as claimed in claim 1 wherein said additive is present in an amount of between about 0.005% by weight and 0.2% by weight based upon the weight of the cement.

4. A hydraulic cement mix as claimed in claim 1 wherein said additive is present in an amount of between about 0.01% by weight and 0.1% by weight based upon the weight of the cement.

5. A hydraulic cement mix as claimed in claim 1 wherein said additive is selected from the group consisting of glycerophosphoric acid, calcium glycerophosphate, magnesium glycerophosphate, potassium glycerophosphate and sodium glycerophosphate.

6. A hydraulic cement mix as claimed in claim 1 wherein said salt comprises an alkali metal glycerophosphate or an alkaline earth metal glycerophosphate.

7. A hydraulic cement mix as claimed in claim 1 wherein said additive comprises calcium glycerophosphate.

8. A hydraulic cement mix as claimed in claim 1 wherein said hydraulic cement comprises portland cement.

9. A hydraulic cement mix as claimed in claim 1 wherein said aggregate comprises sand and said cement mix comprises a mortar mix.

10. A hydraulic cement mix as claimed in claim 1 wherein said aggregate comprises sand and crushed stone or gravel and said cement mix comprises a concrete mix.

11. A process for increasing the strength of hydraulic cement mixes comprising incorporating in a hydraulic cement mix, including a hydraulic cement, aggregate and sufficient water to effect hydraulic setting of said cement, an additive comprising glycerophosphoric acid or salts glycerophosphoric acid and being present in an amount sufficient to increase the strength of the mix when hardened.

12. A hydraulic cement mix as claimed in claim 11 wherein said additive is present in an amount of up to 0.2% by weight based upon the weight of the cement.

13. A process as claimed in claim 11 wherein said additive is present in an amount of between about 0.005% by weight to about 0.2% by weight based upon the weight of the cement.

14. A process as claimed in claim 11 wherein said additive is present in an amount of between about 0.01% by weight and 0.1% by weight based upon the weight of the cement.

15. A process as claimed in claim 11 wherein said additive is selected from the group comprising glycerophosphoric acid, calcium glycerophosphate, magnesium glycerophosphate, potassium glycerophosphate and sodium glycerophosphate.

16. A hydraulic cement mix as claimed in claim 11 wherein said salt comprises an alkali metal glycerophosphate or an alkaline earth metal glycerophosphate.

17. A process as claimed in claim 11 wherein said additive is calcium glycerophosphate.

18. A process as claimed in claim 11 wherein said hydraulic cement comprises portland cement.

19. A process as claimed in claim 11 wherein said aggregate comprises sand and said cement mix comprises a mortar mix.

20. A process as claimed in claim 11 wherein said aggregate comprises sand and crushed stone or gravel and said cement mix comprises a concrete mix.

* * * * *

UNITED STATES PATENT AND TRADEMARK OFFICE
CERTIFICATE OF CORRECTION

PATENT NO. : 4,098,614
DATED : July 4, 1978
INVENTOR(S) : James A. Ray

It is certified that error appears in the above-identified patent and that said Letters Patent are hereby corrected as shown below:

Column 1, Line 15, "radiation" should be --retardation--.

Column 2, Line 55, "means" should be --mean--.

Column 3, Line 8, after "including" insert --hydraulic--.

Column 9, Line 68, "comprises" should be --comprised--.

Column 12, Line 33, after "salts" insert --of--.

Signed and Sealed this

Sixth Day of February 1979

[SEAL]

Attest:

RUTH C. MASON
Attesting Officer

DONALD W. BANNER
Commissioner of Patents and Trademarks